US010924399B2

(12) United States Patent
Filsfils et al.

(10) Patent No.: US 10,924,399 B2
(45) Date of Patent: Feb. 16, 2021

(54) SEGMENT ROUTING PACKET POLICIES AND FUNCTIONS INCLUDING AN ENGINEERED REVERSE REPLY PATH PROVIDING EFFICIENCIES IN COMMUNICATING PACKETS IN A NETWORK

(71) Applicant: Cisco Technology, Inc., San Jose, CA (US)

(72) Inventors: Clarence Filsfils, Brussels (BE); Francois Clad, Strasbourg (FR); Pablo Camarillo Garvia, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 15/922,860

(22) Filed: Mar. 15, 2018

(65) Prior Publication Data

US 2019/0288940 A1 Sep. 19, 2019

(51) Int. Cl.
*H04L 12/741* (2013.01)
*H04L 12/781* (2013.01)
*H04L 29/06* (2006.01)

(52) U.S. Cl.
CPC .............. *H04L 45/74* (2013.01); *H04L 45/52* (2013.01); *H04L 69/22* (2013.01)

(58) Field of Classification Search
CPC .......... H04L 45/52; H04L 45/74; H04L 69/22
See application file for complete search history.

(56) References Cited

U.S. PATENT DOCUMENTS

| | | | |
|---|---|---|---|
| 9,246,799 | B2 | 1/2016 | Guichard et al. |
| 9,537,769 | B2 | 1/2017 | Bryant et al. |
| 9,762,488 | B2 | 9/2017 | Previdi et al. |
| 10,063,475 | B2 | 8/2018 | Previdi et al. |
| 10,382,334 | B2 | 8/2019 | Previdi et al. |
| 10,516,610 | B2 | 12/2019 | Filsfils et al. |

(Continued)

OTHER PUBLICATIONS

Filsfls et al., "SRv6 Network Programming," draft-filsfils-spring-srv6-network-programming-04, Mar. 4, 2018, The Internet Society, Reston, VA, USA (fifty-seven pages).

(Continued)

*Primary Examiner* — Rhonda L Murphy
(74) *Attorney, Agent, or Firm* — The Law Office of Kirk D. Williams

(57) ABSTRACT

In one embodiment, segment routing network processing of packets is performed on segment routing packets to use engineered segment routing reverse reply paths which provide efficiencies in communicating packets in a network. In one embodiment, a source node selects a segment identifier of a destination node, with the segment identifier specifying a function value of a dynamic return path segment routing function in order to invoke this function on the destination node. The source node then sends a segment routing packet to the destination address of this segment identifier. Reacting to receipt of this packet and the function value of the dynamic return path segment routing function in the destination address or current segment identifier of the packet, a receiving node generates a responding segment routing packet including the segment identifiers from the received packet in reverse traversal order.

18 Claims, 9 Drawing Sheets

(56) References Cited

U.S. PATENT DOCUMENTS

| | | | | |
|---|---|---|---|---|
| 2006/0098657 | A1* | 5/2006 | Vasseur | H04L 45/04 370/392 |
| 2016/0099867 | A1* | 4/2016 | Guichard | H04L 45/306 370/392 |
| 2017/0237656 | A1 | 8/2017 | Gage | |
| 2018/0375764 | A1 | 12/2018 | Filsfils et al. | |
| 2018/0375768 | A1 | 12/2018 | Previdi et al. | |
| 2018/0375968 | A1 | 12/2018 | Bashandy et al. | |
| 2019/0215267 | A1 | 7/2019 | Filsfils et al. | |
| 2019/0394211 | A1 | 12/2019 | Filsfils et al. | |

OTHER PUBLICATIONS

Filsfls et al., "Segment Routing Architecture," draft-ietf-spring-segment-routing-15, Jan. 25, 2018, The Internet Society, Reston, VA, USA (thirty-one pages).

Previdi et al, "IPv6 Segment Routing Header (SRH)," draft-ietf-6man-segment-routing-header-10, Mar. 17, 2018, The Internet Society, Reston, VA, USA (thirty-three pages).

Rekhter et al, "A Border Gateway Protocol 4 (BGP-4)," RFC 4271, Jan. 2006, The Internet Society, Reston, VA, USA (104 pages).

Bates et al., "Multiprotocol Extensions for BGP-4," RFC 2283, Feb. 1998, The Internet Society, Reston, VA, USA (nine pages).

Deering et al., "Internet Protocol, Version 6 (IPv6) Specification," RFC 2460, Dec. 1998, The Internet Society, Reston, VA, USA (thirty-nine pages).

S. Deering and R. Hinden, "Internet Protocol, Version 6 (IPv6) Specification," RFC 8200, Jul. 2017, The Internet Society, Reston, VA, USA (forty-two pages).

T. Bates et al., "Multiprotocol Extensions for BGP-4," RFC 4760, Jan. 2007, The Internet Society, Reston, VA, USA (twelve pages).

Rosen et al., "Multiprotocol Label Switching Architecture," RFC 3031, Jan. 2001, The Internet Society, Reston, VA, USA (sixty-one pages).

"Information technology—Telecommunications and information exchange between systems—Intermediate System to Intermediate System intra-domain routeing information exchange protocol for use in conjunction with the protocol for providing the connectionless-mode network service (ISO 8473)," Second Edition, Nov. 15, 2002, ISO/IEC 2002, Switzerland (210 pages).

* cited by examiner

SEGMENT ROUTING PACKET POLICIES AND FUNCTIONS INCLUDING AN ENGINEERED REVERSE REPLY PATH PROVIDING EFFICIENCIES IN COMMUNICATING PACKETS IN A NETWORK

TECHNICAL FIELD

The present disclosure relates generally to sending of packets through a packet network, such as, but not limited to, according to segment routing of packets through a packet network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network based one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
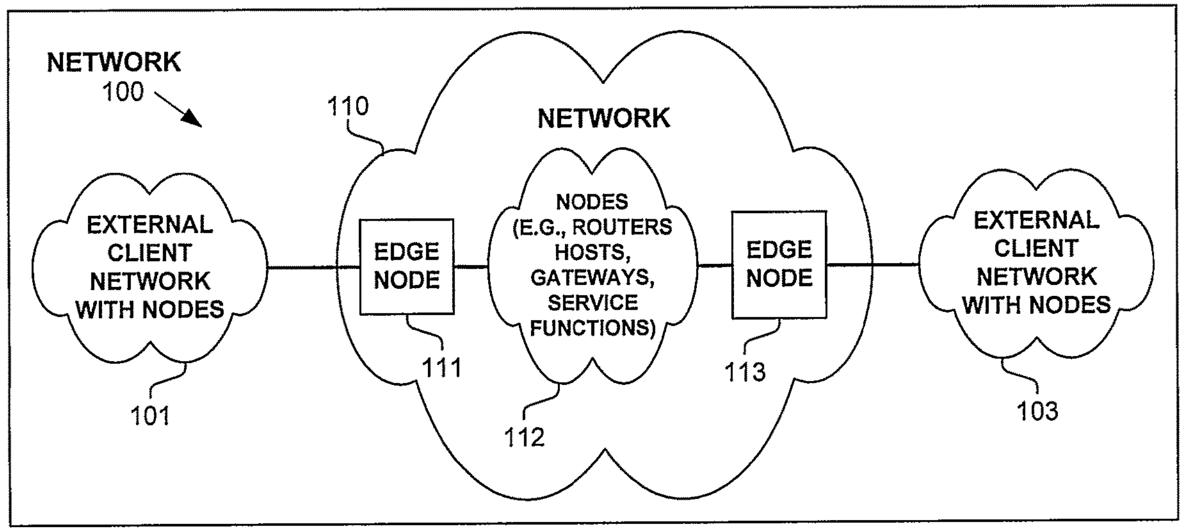
FIG. 1A illustrates a network operating according to one embodiment.

Disclosed are, inter alia, methods, apparatus, computer-storage media, mechanisms, and means associated with segment routing network processing of packets, including using segment routing packet policies and functions that include an engineered reverse reply path providing efficiencies in communicating packets in a network. In one embodiment, a method is performed for each particular first segment routing packet of one or more first segment routing packets.

In one embodiment, a source node ascertains a first segment routing policy that comprises a first segment list including a first plurality of segment identifiers in a first forwarding order with the last said identifier in the first segment list being a destination segment identifier identifying a destination node in the network and a dynamic return path segment routing function. The source node sends into the network said particular first segment routing packet including a segment routing source address of the source node as its Internet Protocol source address, a first segment routing header comprising the first segment list, and first data comprising source application information from an application in the source node. The particular first segment routing packet is sent through the network to the destination node, which includes segment routing forwarding according to the first segment list.

A destination application in the destination node determines destination application information based on source application information extracted from the received particular first segment routing packet. The destination node reacts to the dynamic return path segment routing function which defines how a second segment list is generated as well as being identified in the destination segment identifier in said received particular first segment routing packet. As part of this reaction, the destination node sends into the network a second segment routing packet comprising the destination segment identifier as its Internet Protocol source address, second data comprising the destination application information, and a second segment routing header comprising the second segment list generated according to the dynamic return path segment routing function. In one embodiment, the second segment list comprises: the segment routing source address acquired from said Internet Protocol source address of said received particular first segment routing packet as the last in said return order in the second segment list, and includes a plurality of the first plurality of segment identifiers in an opposite order of the first forwarding order.

2. Description

Disclosed are, inter alia, methods, apparatus, computer-storage media, mechanisms, and means associated with segment routing packet policies and functions that include an engineered reverse reply path providing efficiencies in communicating segment routing packets in a network. As used herein segment routing (SR) includes, but is not limited to using Internet Protocol Version 4 or 6 (IPv4 or IPv6) addresses as segment identifiers (SIDs). Further, SR includes, but is not limited IPv6 SR (SRv6) and/or IPv4 (SRv4).

The terms "node" or "network node" are used herein to refer to a router or host. The term "route" is used herein to refer to a fully or partially expanded prefix (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix. Also, as used herein, "forwarding information" includes, but is not limited to, information describing how to process (e.g., forward, send, manipulate, modify, change, drop, copy, duplicate, receive) corresponding packets. In one embodiment, determining forwarding information is performed via an ingress lookup operation and an egress lookup operation. Also, the term "processing" when referring to processing of a packet process refers to a broad scope of operations performed in response to a packet, such as, but not limited to, forwarding/sending, dropping, manipulating/modifying/changing, receiving, duplicating, creating, applying one or more service or application functions to the packet or to the packet switching device (e.g., updating information), etc. Also, as used herein, the term processing in "parallel" is used in the general sense that at least a portion of two or more operations are performed overlapping in time.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Some networking communications require the messages exchanged between two end hosts to traverse the network along the same path in both directions, or at least pass through a same network node or cooperating network nodes providing a network service. In particular, some network nodes, such as network address translation (NAT) nodes or firewalls, typically require packets of a bidirectional communication between nodes to go through them in both directions as the processing of packets may be dependent on state stored within one of these network application nodes.

On the other hand, asymmetric forwarding may be preferred in other scenarios, in particular when the traffic is itself asymmetric. Data transfers, for example, usually involve high volume traffic in the direction where the data goes (e.g., from server to client), but traffic in the reverse direction may be very low. In such case, a network operator may want to steer packets, via a segment routing policy, along a traffic engineered path with more available bandwidth, while leaving the returning acknowledgements on a default path determined by standard routing (e.g., Open Shortest Path First).

FIG. 1A illustrates a segment routing-capable network 100 operating according to one embodiment. As shown, network 100 includes client networks 101 and 103 (which are the same network in one embodiment) communicatively coupled to to segment routing (SR) provider network 110. In one embodiment, each of client networks 101 and 103 include hosts (e.g., end nodes) with upper-layer applications that communicate via network 100. In one embodiment, some of the hosts in client network 101 and/or 103 are SR-capable in that they can generate and process segment routing packets.

In one embodiment, SR-capable network 110 (e.g., a provider network) includes SR edge nodes 111 and 113 and a network 112 of network nodes including SR-capable routers (and possibly some that are not SR-capable in that they do not process a segment routing header/complete segment identifier), SR gateways, service functions, and end nodes. In one embodiment, SR edge nodes 111 and 113 process packets received from networks 101 and 103, which may include encapsulating or otherwise processing these packets into SR packets or adding a SR header to these packets according to a data plane ascertained SR policy, and subsequently decapsulating or removing a segment routing header and forwarding the native packets into network 101 and 103.

In one embodiment and in response to receiving a packet, a SR edge node 111, 113 and/or a SR node within network 112 determines a SR policy (e.g., list of complete segment identifiers) through and/or to which to forward a SR packet encapsulating the native packet. These policies can change in response to network conditions, network programming, etc. In one embodiment, the SR policy specifies to add one or more SR headers, each with one or more complete segment identifiers, resulting in a SR packet having one or more SR headers. In one embodiment, a native packet is received without a SR header, and the SR node encapsulates the native packet in a SR packet including one or more added SR headers, each including one or more complete segment identifiers. In one embodiment, a SR packet is received with a SR header, and with SR node adding one or more SR headers resulting in a SR packet including one or more added SR headers, each including one or more complete segment identifiers. In contrast, and for each of these scenarios a single SR header could have been used that includes all of the complete segment identifiers.

Figure 1B:
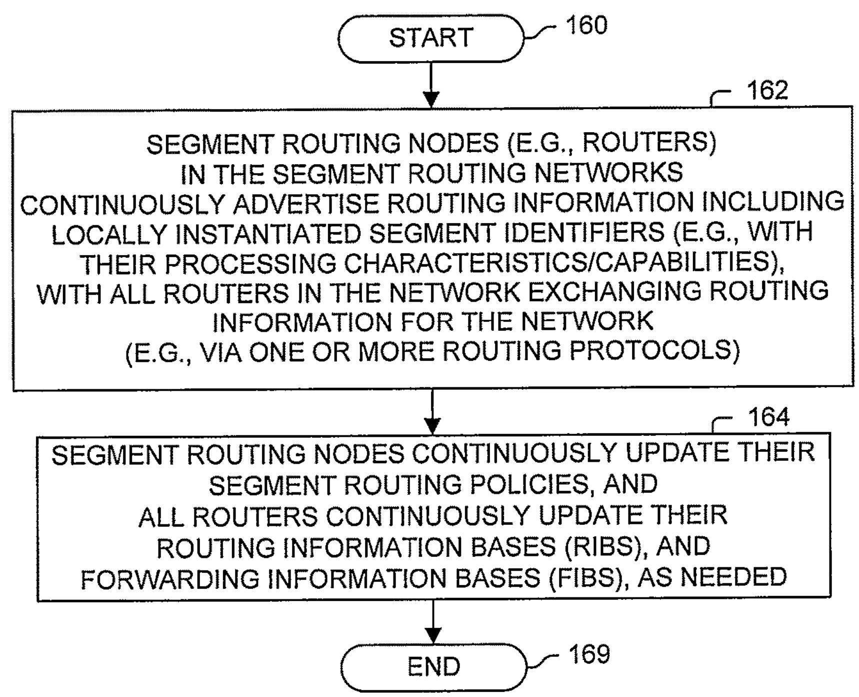
FIG. 1B illustrates a process according to one embodiment.

FIG. 1B illustrates a process according to one embodiment associated with segment routing packet policies and functions that include an engineered reverse reply path providing efficiencies in communicating segment routing packets in a network. Processing begins with process block 160. In process block 162, segment routing and non-segment routing nodes in the network(s) continuously advertise and exchange routing information including segment routing information (e.g., routes including segment identifiers of network nodes and their corresponding function or function/arguments, attributes of segment identifiers, attributes of node) and other routing information (e.g., IPv4 or IPv6 topology information) typically via one or more routing protocols and/or other protocols. In one embodiment, a segment identifier or other route associated with a network node is advertised with an attribute indicating whether penultimate segment popping (PSP) will or will not be correspondingly performed.

In process block 164, segment routing and other network nodes continuously update their segment routing policies and routing information as required (e.g., based on information received via a routing protocol, from a network management system, etc.). Processing of the flow diagram of FIG. 1B is complete as indicated by process block 169.

Figure 2A:
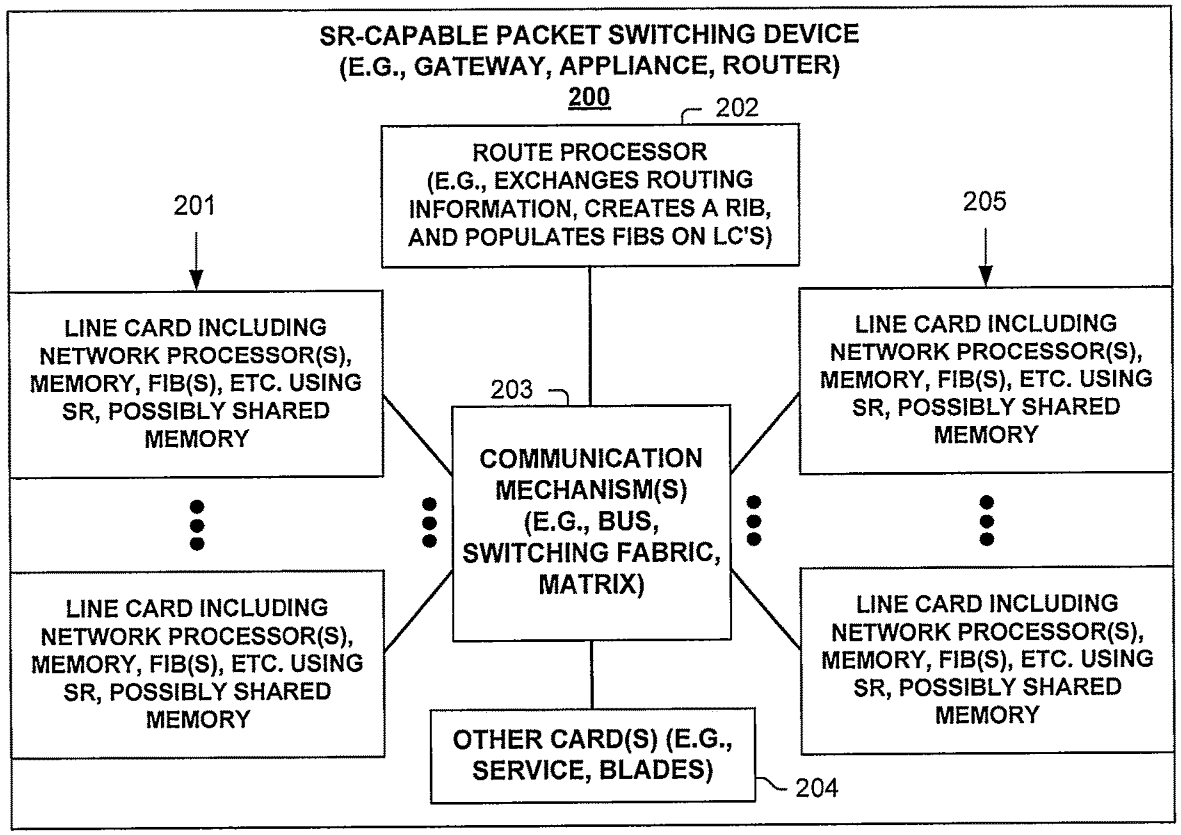
FIG. 2A illustrates a packet switching device according to one embodiment.
Figure 2B:
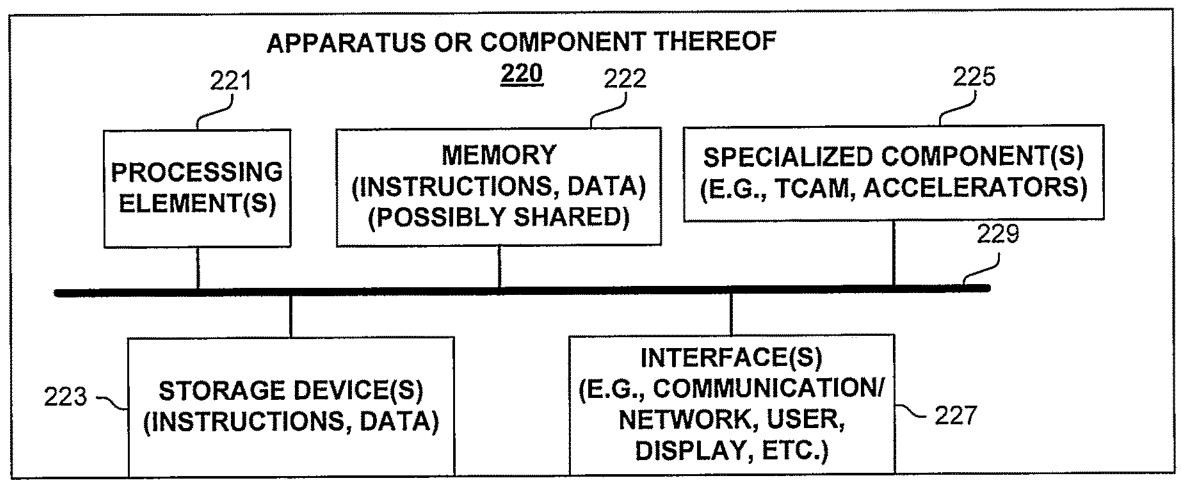
FIG. 2B illustrates an apparatus according to one embodiment.

FIGS. 2A-B and their discussion herein provide a description of various SR network nodes according to one embodiment.

FIG. 2A illustrates one embodiment of a segment routing-capable packet switching device 200 (e.g., SR gateway, appliance, router, host, end node) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with segment routing packet policies and functions that include an engineered reverse reply path providing efficiencies in communicating segment routing packets in a network. Packet switching device 200 also has a control plane with one or more processing elements 202 for managing the control plane and/or control plane processing of packets associated with segment routing packet policies and functions that include an engineered reverse reply path providing efficiencies in communicating segment routing packets in a network. Packet switching device 200 also includes other cards 204 (e.g., service cards, blades) which include processing elements that are used in one embodiment to process (e.g., forward/send, drop, manipulate, change, modify, receive, create, duplicate, perform SR gateway functionality possibly with shared memory with one or more service functions, apply a service according to one or more service functions) packets associated with segment routing packet policies and functions that include an engineered reverse reply path providing efficiencies in communicating segment routing packets in a network, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, SR gateway and service functions are implemented on a line card 201, 205.

FIG. 2B is a block diagram of an apparatus 220 used in one embodiment associated with segment routing packet policies and functions that include an engineered reverse reply path providing efficiencies in communicating segment routing packets in a network. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup and/or packet processing operations and/or service function, associative memory, binary and/or ternary content-addressable memory, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
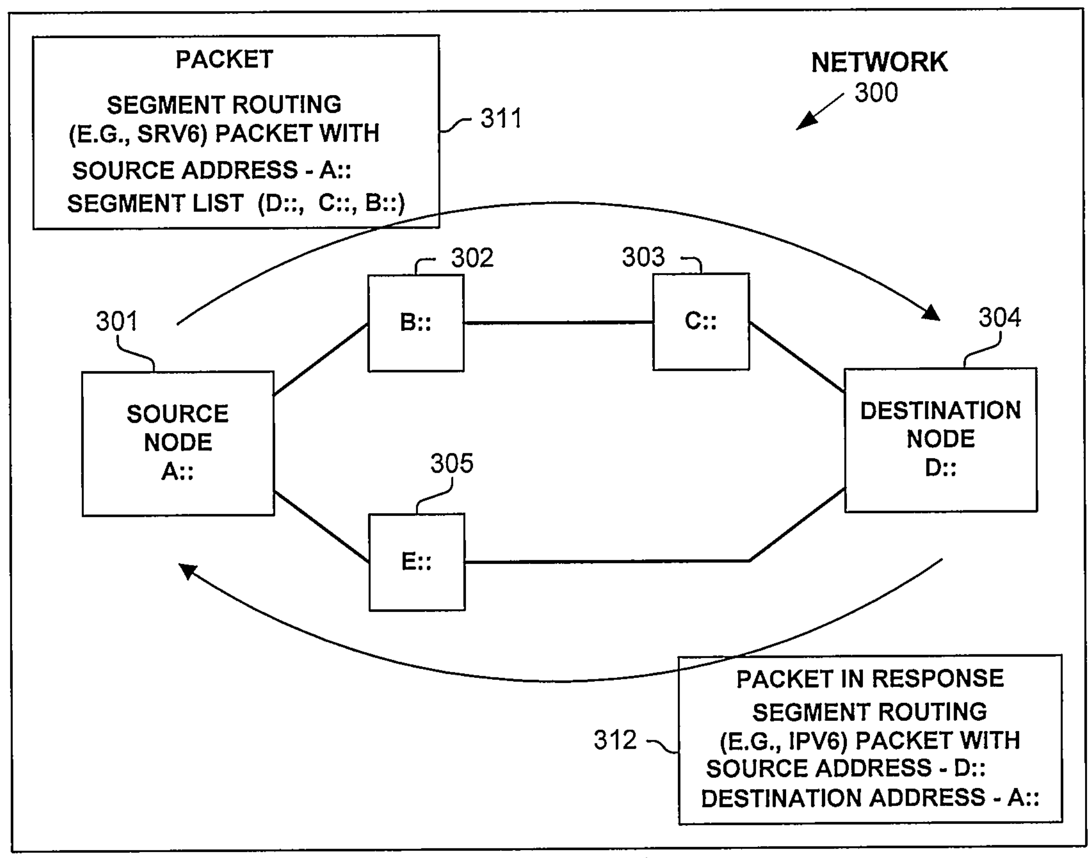
FIG. 3A illustrates a network operating according to one embodiment.

FIG. 3A illustrates a network 300 operating according to one embodiment. As shown, network 300 comprises:

segment routing source node 301 including an advertised segment identifier (IP address) of A::,

- segment routing node 302 including an advertised segment identifier (IP address) of B::,
- segment routing node 303 including advertised segment identifier (IP address) of C::,
- segment routing destination node 304 including advertised segment identifiers (IP addresses) of D::, and
- segment routing node 305 including an advertised segment identifier (IP address) of E::.

In one embodiment, a source application of source node 301 determines to communicate with a destination application in destination node 304, with source node 301 determining a segment routing path of B:: (node 302), C:: (node 303 which does not perform penultimate segment popping so node 304 will receive a segment routing packet with the segment list determined by source node 301) and D:: (node 304 and not invoking the dynamic return path segment routing function) to traverse network 300. Packet 311 (containing source application data in its data/payload field) is then sent from source node 301, traverses network 300, and is received by destination node 304 (in one embodiment with the packet having destination address of D::, and a segments left indicating D:: in the segment list of packet 311). Destination node 304 extracts the application data from packet 311, and provides this application data to an upper layer application, which provides response data. Destination node 304 then sends IP packet 312 into the network, with the destination data in the data/payload field of packet 312. IP packet 312, having an IP source address of node 304 and IP destination address of source node 301 will traverse the network according to standard network routing (e.g., based on Open Shortest Path First) to source node 301.

Figure 3B:
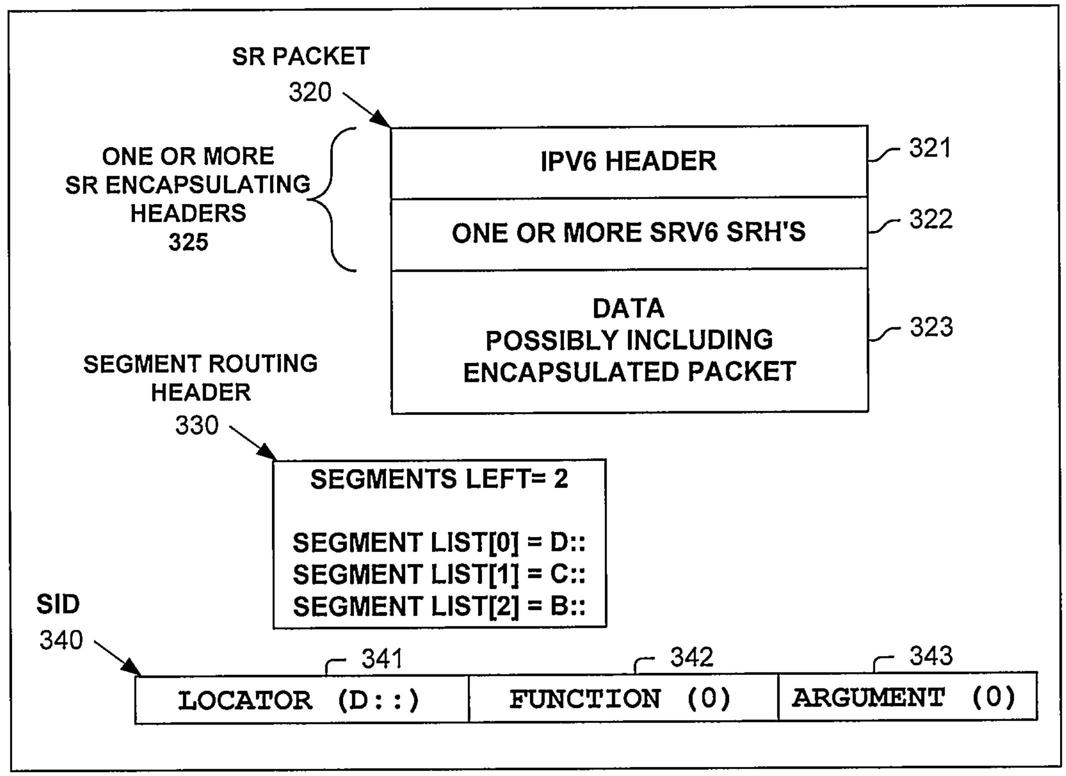
FIG. 3B illustrates a segment routing packet according to one embodiment.

FIG. 3B illustrates a segment routing (SR) packet 320 according to one embodiment. As shown, SR packet 320 includes one or more segment routing encapsulating headers 325, each typically including an IPv6 header 321 and one or more SRv6 segment routing headers 322. Additionally, segment routing packet 320 includes an IPv6 data/payload field 323, including application data, encapsulated packets, and/or other values.

FIG. 3B also illustrates the segment list and segments left of packet 311 when sent from source node 301 (of FIG. 3A). Segment routing header includes the three ordered segment list elements of segment identifiers B::, C::, and D::, with the segments left of two. In one embodiment, segment identifier 340 (included in packet 311) includes locator 341 of D::, function value 342 of zeros (e.g., do not invoke dynamic return path segment routing function in destination node 304) and argument 343 of zeros.

Figure 4A:
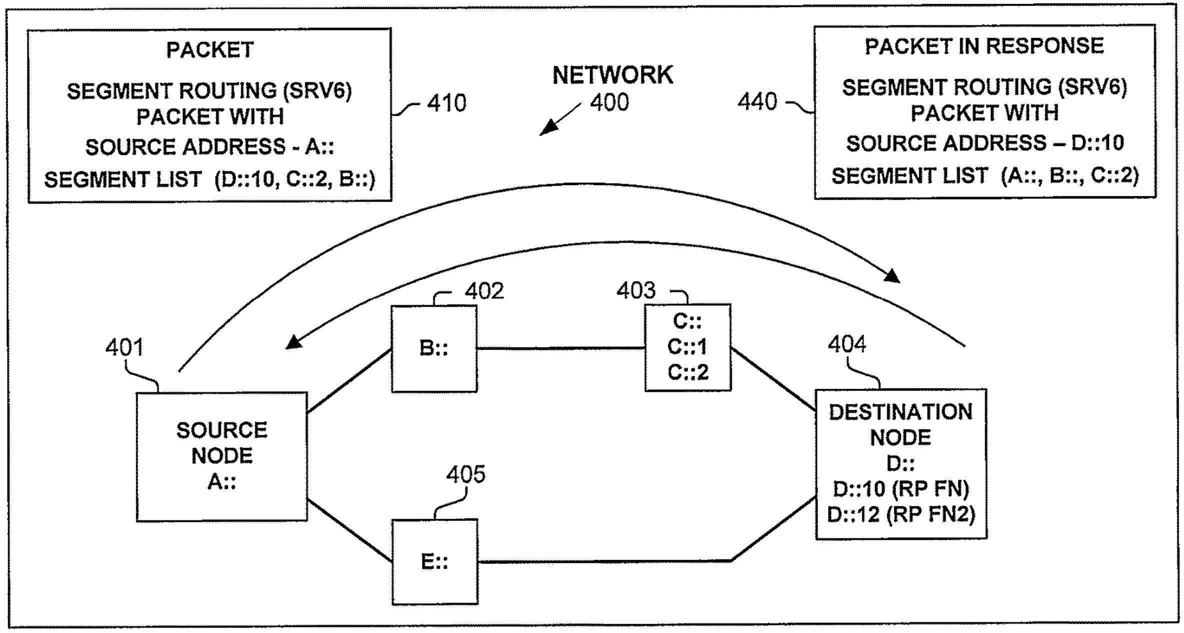
FIG. 4A illustrates a network operating according to one embodiment.

FIG. 4A illustrates a network 400 operating according to one embodiment. As shown, network 400 comprises:

- segment routing source node 401 including an advertised segment identifier (IP address) of A::,
- segment routing node 402 including an advertised segment identifier (IP address) of B::,
- segment routing node 403 including advertised segment identifiers (IP addresses) of C::, C::1 and C::2,
- segment routing designation node 404 including advertised segment identifiers (IP addresses) of D:: (normal process), D::10 (invoke one embodiment of a dynamic return path segment routing function, sometimes notated as "RP FN" for return path function in the figures), and D::12 (invoke one embodiment of a dynamic return path segment routing function, sometimes notated as "RP FN2" for return path function in the figures), and
- segment routing node 405 including an advertised segment identifier (IP address) of E::.

In one embodiment, a source application of source node 401 determines to communicate with a destination application in destination node 404, with source node 401 determining a segment routing path of B:: (node 402), C::2 (node 403) and D::10 (node 404 and invoke the dynamic return path segment routing function) to traverse network 400.

In one embodiment, node 403 advertises multiple segment identifiers C:: (may or may not perform penultimate segment popping), C::1 (perform penultimate segment popping) and C::2 (do not perform penultimate segment popping). As source node 401 has determined to have end destination node 404 invoke the dynamic return path segment routing function, packet 410 must include the segment routing path which is going to be traversed in reverse by response packet 440. In one embodiment, whether a particular segment routing node performs or does not perform penultimate segment popping is an attribute of the segment routing processing. In such embodiment, the source node selects a segment routing node (and possibly a particular segment routing identifier of the segment routing node with an attribute of not performing penultimate segment popping) that will leave the segment routing header in the packet.

Packet 410 (containing source application data in its data/payload field) is then sent from source node 401, traverses network 400, and is received by destination node 404 (in one embodiment with the packet having destination address of D::10, and a segments left indicating D::10 in the segment list of packet 410). Because the dynamic return path segment routing function is a function located within a segment identifier in a manner determined by node 404, intermediate nodes 402 and 403 typically cannot determine whether a segment identifier will or will not cause a dynamic return path segment routing function to be invoked.

Destination node 404 extracts the application data from packet 410, and provides this application data to an upper layer application, which provides response data. Destination node 404 also invokes the dynamic return path segment routing function to cause response packet 440 to traverse network 400 according to a reverse of the ordered segment identifiers in source packet 410. Correspondingly, response segment routing packet 440 includes its IPv6 source address of D::10, and with a segment routing list of C::2, B::, and A::. Destination node 404 then sends segment routing packet 440 into the network, with the destination data in the data/payload field of packet 440. Response packet 440 is segment routing forwarded through network 400 to source node 401.

Figure 4B:
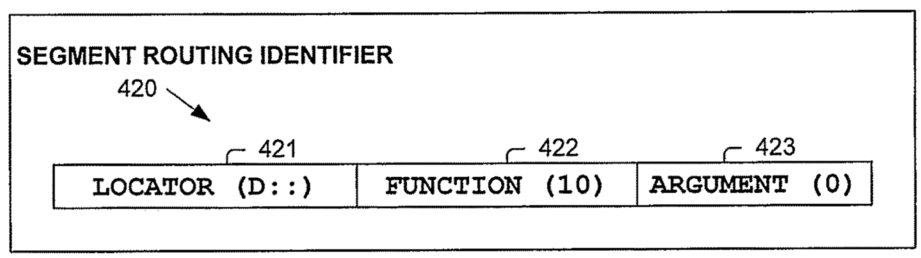
FIG. 4B illustrates a segment identifier according to one embodiment.

FIG. 4B also illustrates segment identifier 420 (included in packet 410), which includes locator 421 of D::, function value 422 of 10 (e.g., invoke dynamic return path segment routing function in destination node 404) and argument 423 of zeros.

Figure 4C:
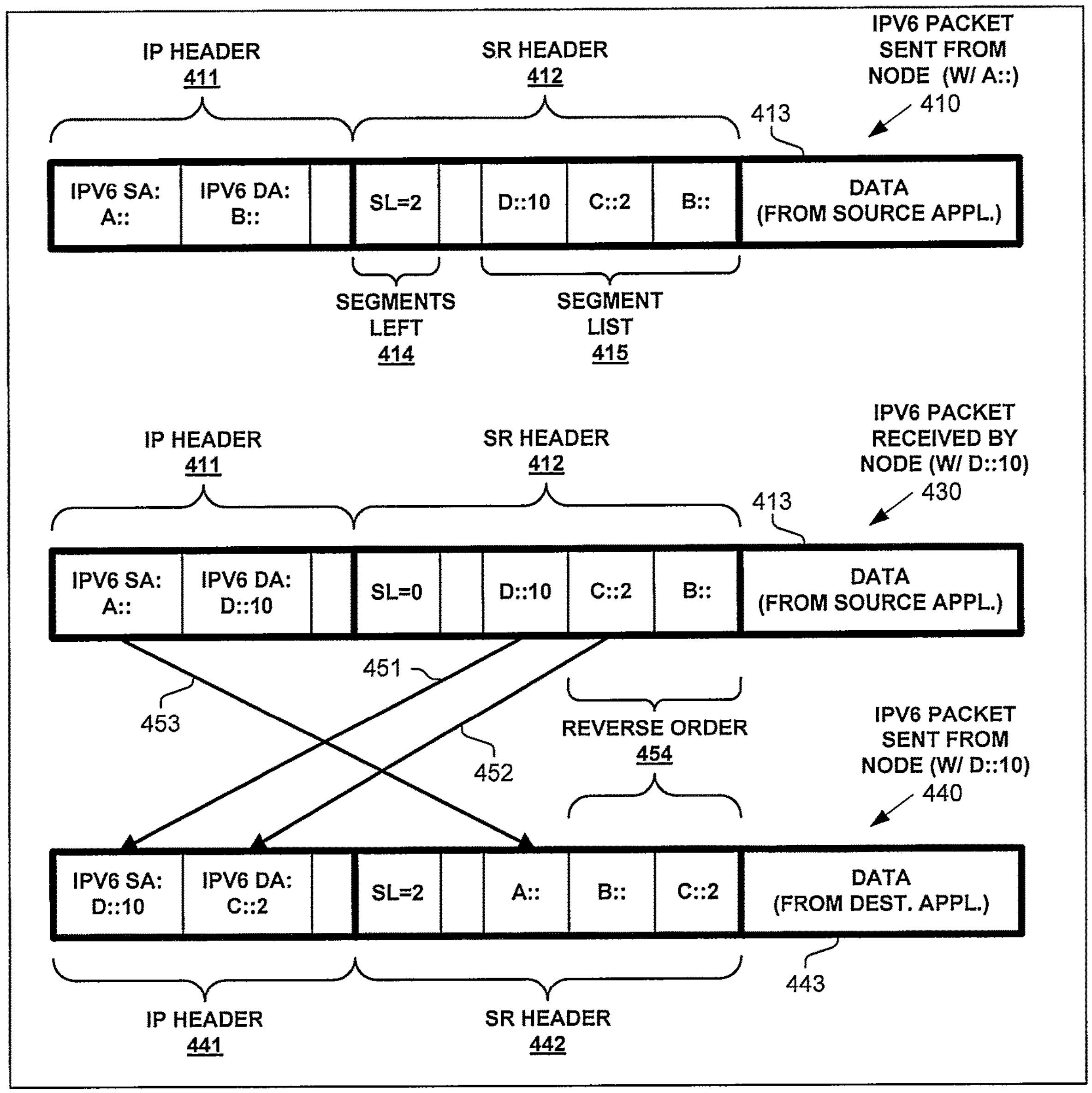
FIG. 4C illustrates processing according to one embodiment.

FIG. 4C illustrates processing of a dynamic return path segment routing function according to one embodiment. IPv6 packet 410 sent from source node 401 (FIG. 4A) comprises an encapsulating header (including IP header 411 and segment routing header 412) and data 413 (payload) including information from a source application. IP header 411 includes an IP source address of A:: and an IP destination address of B::. Segment routing header 412 includes a segments left 414 of two, and segment list 415 of ordered segment identifiers B::, C::2, and D::10.

When received by destination node 404 (FIG. 4A), IPv6 packet (denoted 430 for description purposes as it is the same IPv6 packet 410 reflecting updates after traversing network 400) still comprises encapsulating header (including IP header 411 and segment routing header 412) and data 413 (payload) including information from a source application. However, IP header 411 now includes an IP source address of A:: and an IP destination address of D::10. Segment routing header 412 now includes a segments left of zero, and with the same segment list of ordered segment identifiers B::, C::2, and D::10.

Subsequent to processing by an application in destination node 404 (FIG. 4A), IPv6 segment routing packet 440 is sent into the network. IPv6 packet 440 (SRv6 packet) comprises an encapsulating header (including IP header 441 and segment routing header 442) and data 443 (payload) including information from a destination application. In response to one embodiment invoking the dynamic return path segment routing function by destination node 404, IP header 441 and segment routing header 442 are populated as shown and/or described herein. In one embodiment, the dynamic return path segment routing function of destination node 404 references transport layer information (e.g., protocol, port) of received packet 430, and configures a return socket or other mechanism to populate IP header 441 and segment routing header 442 as shown and/or described herein.

In one embodiment, IP header 441 includes an IP source address copied (451) from the last segment identifier in the segment list of segment routing header 412 (or from the IP destination address of received packet 410 received by destination node 404); and an IP destination address copied (452) of the next-to-last segment identifier in the segment list of segment routing header 412.

In one embodiment, the Internet Protocol source address of packet 430 is copied (453) as a last segment identifier of the ordered segment list of segment routing header 442. All but the last segment identifier in the ordered segment list of segment routing header 412 is populated by copying in reverse order (454) the ordered segment list of segment routing header 442.

Figure 4D:
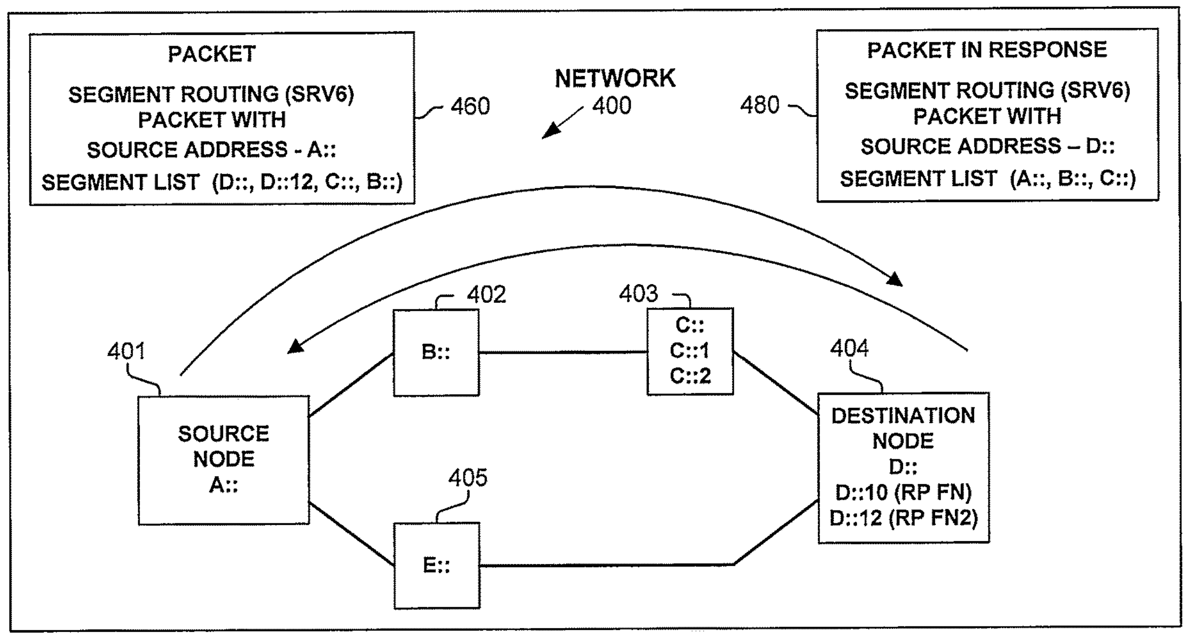
FIG. 4D illustrates a network operating according to one embodiment.

FIG. 4D illustrates network 400 (also shown in FIG. 4A). In one embodiment, a source application of source node 401 determines to communicate with a destination application in destination node 404, with source node 401 determining a segment routing path of B:: (node 402), C:: (node 403) and D::12 (node 404 and invoke a dynamic return path segment routing function with D::12) to traverse network 400.

Packet 460 (containing source application data in its data/payload field) is then sent from source node 401, traverses network 400, and is received by destination node 404 (in one embodiment with the packet having destination address of D::12, and a segments left indicating D::12 with a second segment identifier of node 404 remaining to be processed in the segment list of packet 460). The second segment identifier of node 404 ensures that node 403 will not perform penultimate segment popping in one embodiment. Also, because the dynamic return path segment routing function is a function located within a segment identifier in a manner determined by node 404, intermediate nodes 402 and 403 typically cannot determine whether a segment identifier will or will not cause a dynamic return path segment routing function to be invoked.

Based on segment identifier D:12, destination node 404 invokes the dynamic return path segment routing function to cause a response packet 480 to traverse network 400 according to a reverse of the ordered segment identifiers in source packet 460, excluding segment identifier D::12. Correspondingly, response segment routing packet 480 includes its IPv6 source address of D::, and with a segment routing list of C::, B::, and A::.

Destination node extracts the application data from packet 460, and provides this application data to an upper layer application, which provides response data. Destination node 404 then sends segment routing packet 480 into the network, with the destination data in the data/payload field of packet 480. Response packet 480 is segment routing forwarded through network 400 to source node 401.

Figure 4E:
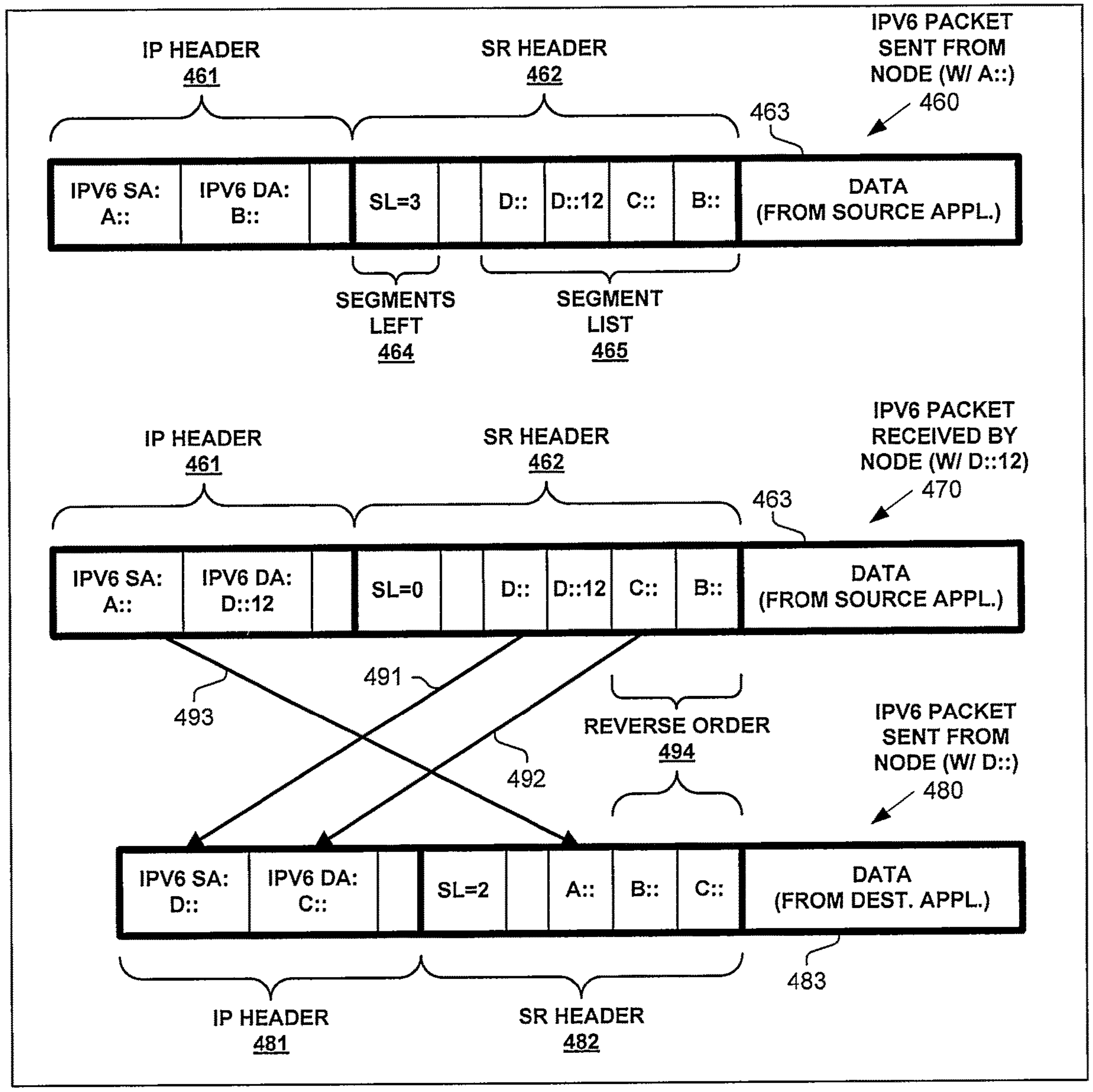
FIG. 4E illustrates processing according to one embodiment.

FIG. 4E illustrates processing of a dynamic return path segment routing function according to one embodiment. IPv6 packet 460 sent from source node 401 (FIG. 4D) comprises an encapsulating header (including IP header 461 and segment routing header 462) and data 463 (payload) including information from a source application. IP header 461 includes an IP source address of A:: and an IP destination address of B::. Segment routing header 462 includes a segments left 464 of three, and segment list 465 of ordered segment identifiers B::, C::, D::12, and D::.

When received by destination node 404 (FIG. 4D), IPv6 packet (denoted 470 for description purposes as it is the same IPv6 packet 460 reflecting updates after traversing network 400) still comprises encapsulating header (including IP header 461 and segment routing header 462) and data 463 (payload) including information from a source application. However, IP header 461 now includes an IP source address of A:: and an IP destination address of D::12. Segment routing header 462 now includes a segments left of one, and with the same segment list of ordered segment identifiers B::, C::, D::12, and D::.

Subsequent to processing by an application in destination node 404 (FIG. 4D), IPv6 segment routing packet 480 is sent into the network. IPv6 packet 480 (SRv6 packet) comprises an encapsulating header (including IP header 481 and segment routing header 482) and data 483 (payload) including information from a destination application. In response to one embodiment invoking the dynamic return path segment routing function by destination node 404, IP header 481 and segment routing header 482 are populated as shown and/or described herein. In one embodiment, the dynamic return path segment routing function of destination node 404 references transport layer information (e.g., protocol, port) of received packet 470, and configures a return socket or other mechanism to populate IP header 481 and segment routing header 482 as shown and/or described herein. In one embodiment, the dynamic return path segment routing function of destination node 404 also performs penultimate segment popping on received packet 470 removing segment routing header 462, and performs processing on the resultant packet.

In one embodiment, IP header 481 includes an IP source address copied (491) from the last segment identifier in the segment list of segment routing header 462 (or some other address of node 404); and an IP destination address copied (492) of the third-to-last segment identifier (i.e., a segment identifier of the first segment routing node for packet 480 to traverse in network 400) in the segment list of segment routing header 462.

In one embodiment, the Internet Protocol source address of packet 470 is copied (493) as a last segment identifier of the ordered segment list of segment routing header 482. All but the second to last segment identifier (i.e., that of dynamic return path segment routing function) in the ordered segment list of segment routing header 462 is populated by copying in reverse order (494) the ordered segment list of segment routing header 482.

Figure 5:
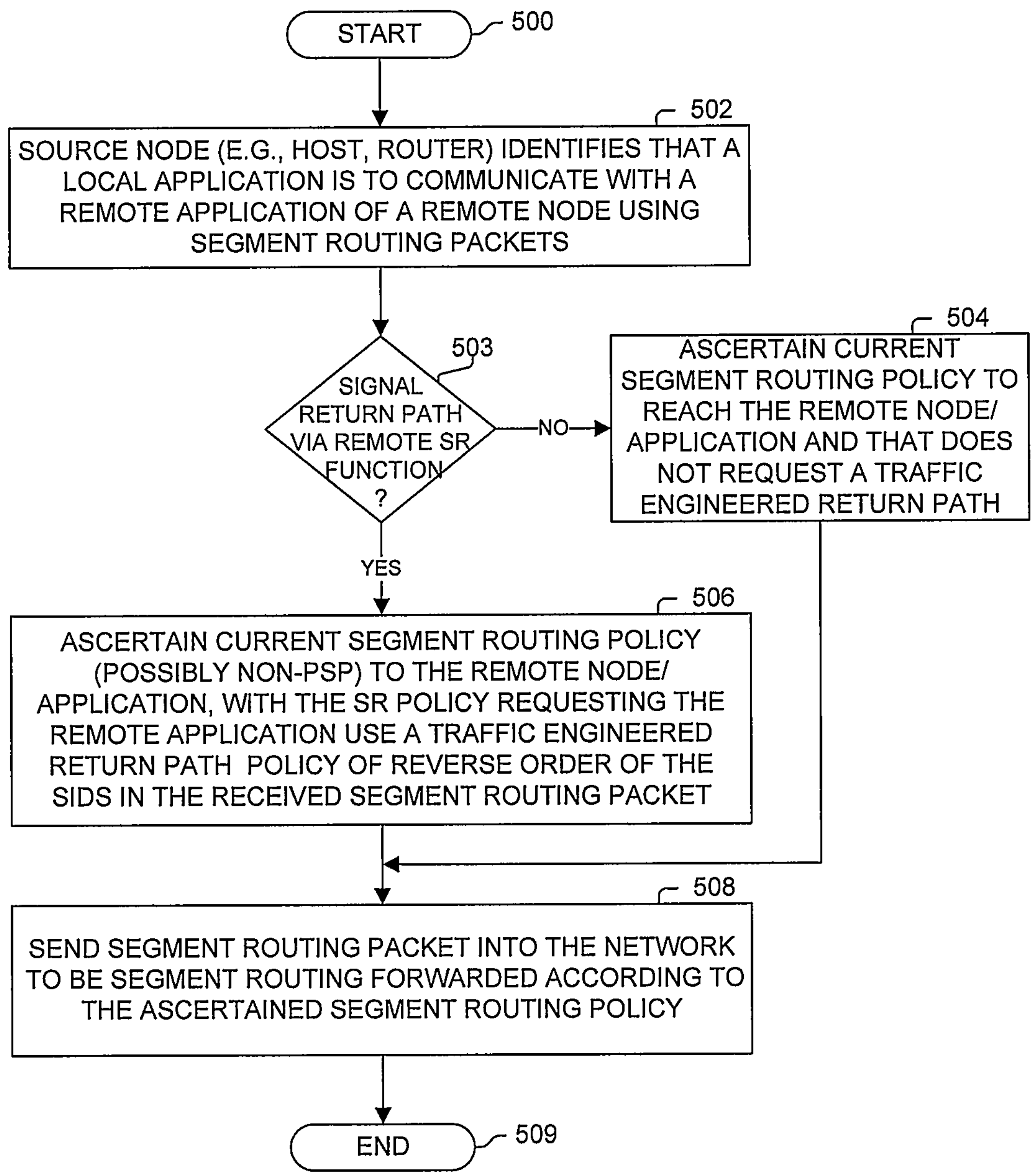
FIG. 5 illustrates a process according to one embodiment.

FIG. 5 illustrates a process according to one embodiment. Processing begins with process block 500. In process block 502, a source node (e.g., host, router) identifies that a local application is to communicate with a remote application of a remote node using segment routing packets. As determined in process block 503, if the source node is to signal to the destination node (e.g., host, router) to invoke a dynamic return path segment routing function at the destination node, then processing proceeds to process block 506, else processing proceeds to process block 504. In process block 504, the source node ascertains a current segment routing policy (as a segment routing policy can change over time e.g., to reflect the current topology of a network) to reach the remote node/application and that does not request a traffic engineered return path, and processing proceeds to process block 508. In process block 506, the source node ascertains a current (possibly non-penultimate segment popping) segment routing policy (as a segment routing policy can change over time e.g., to reflect the current topology of a network) to reach the remote node/application and that does request a traffic engineered return path of a reverse order of the segment identifiers in the received packet, and processing proceeds to process block 508.

In process block 508, the source node sends the segment routing packet into the network to be segment routing forwarded according to the ascertained segment routing policy. Processing of the flow diagram of FIG. 5 is complete as indicated by process block 509.

Figure 6:
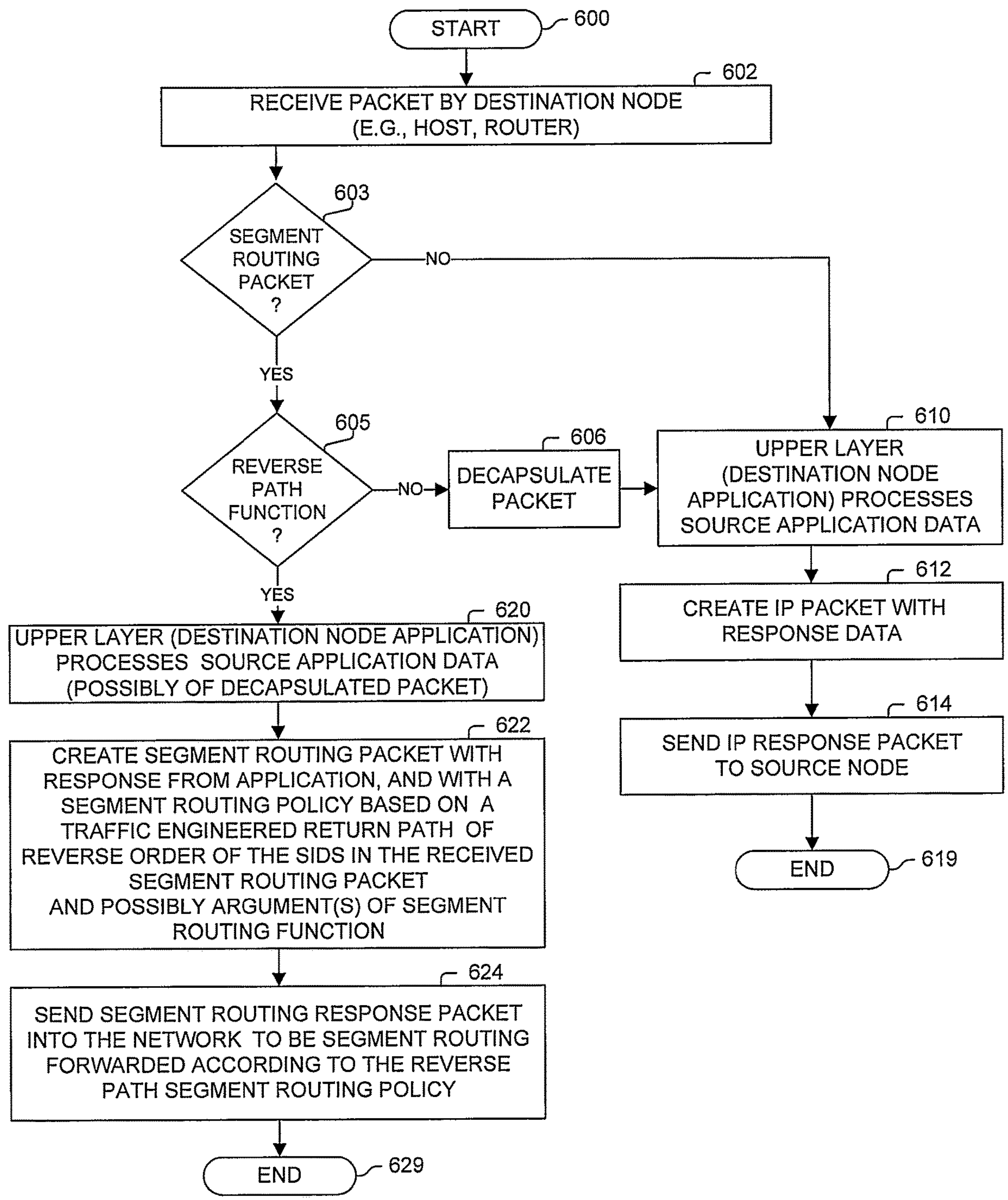
FIG. 6 illustrates a process according to one embodiment.

FIG. 6 illustrates a process according to one embodiment. Processing begins with process block 600. In process block 602, a packet is received by the destination node (e.g., host, router). As determined in process block 603, if the packet is not a segment routing packet, then processing proceeds to process block 610, else processing proceeds to process block 605. As determined in process block 605, if the destination address (and current segment identifier in the segment list of the current segment routing header) specifies to invoke a dynamic return path segment routing function, then processing proceeds to process block 620; else processing proceeds to process block 606.

In process block 606, the segment routing transported packet is decapsulated.

Processing continues with process block 610, wherein the upper layer/destination application processes the source application data. In process block 612, an IP packet is created with response data from the destination application, and with the IP packet (addressed to the source node) being sent into the network in process block 614. Processing of the flow diagram of FIG. 6 is complete as indicated by process block 619.

Processing continues with process block 620, wherein the upper layer/destination application processes the source application data (possibly of a decapsulated packet resulting from penultimate segment popping by the receiving/responding segment routing node). In process block 622, a segment routing packet is created with response data from the destination application, and with a segment routing policy based on a traffic engineered return path of the reverse order of the segment identifiers in the received segment routing packet and possibly argument(s) of segment routing function. As the dynamic return path segment routing function is "dynamic," the reverse path used in a response packet is based on the segment policy as stated in the received packet. Thus, if the source node sending the packet (or an intermediate network node) uses a different segment routing policy reflected in a received packet, the reverse segment routing path of a response packet will be created based on this different segment routing policy. Thus, packets of a stream of packets in which the source node changes the segment routing policy, packets before such change will use a before segment routing policy and packets subsequent to such change will use an after segment routing policy, and the reverse path forwarding of a response packet will correspondingly reflect the before and after segment routing policies.

In process block 624, the destination node sends the segment routing response packet into the network to be segment routing forwarded according to the traffic engineered return path of the reverse order of the segment identifiers in the received segment routing packet. Processing of the flow diagram of FIG. 6 is complete as indicated by process block 629.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

for each particular first segment routing packet of one or more first segment routing packets:

ascertaining a first segment routing policy, by a source node, that comprises a first segment list including a first plurality of segment identifiers in a first forwarding order with the last or second-to-the last segment identifier in the first segment list being a destination segment identifier identifying a destination node in the network and a dynamic return path segment routing function;

sending into the network, by the source node, said particular first segment routing packet including a segment routing source address of the source node as its Internet Protocol source address, a first segment routing header comprising the first segment list, and first data comprising source application information from an application in the source node;

forwarding said particular first segment routing packet through the network to the destination node, including segment routing forwarding according to the first segment list;

receiving said particular first segment routing packet by the destination node;

determining, by a destination application in the destination node, destination application information based on said source application information extracted from said received particular first segment routing packet; and reacting to the dynamic return path segment routing function which defines a generation of a second segment list and is identified in the destination segment identifier in said received particular first segment routing packet, the destination node sending into the network a second segment routing packet comprising the destination segment identifier or another segment identifier of the destination node as its Internet Protocol source address, second data comprising said destination application information, and a second segment routing header comprising the second segment list generated according to the dynamic return path segment routing function;

wherein the second segment list comprises a plurality of the first plurality of segment identifiers listed in an opposite order of the first forwarding order followed by the segment routing source address acquired from said Internet Protocol source address of said received particular first segment routing packet.

2. The method of claim 1, comprising forwarding the second segment routing packet through the network to the source node, including the second segment routing packet traversing an exact same plurality of segment identifiers between the destination node and the source node as traversed by said particular first segment routing packet between the source node and the destination node but in reverse order.

3. The method of claim 1, comprising forwarding the second segment routing packet through the network to the source node, including the second segment routing packet traversing an exact same plurality of segment routing nodes between the destination node and the source node as traversed by said particular first segment routing packet between the source node and the destination node but in reverse order.

4. The method of claim 1, comprising the destination node advertising, via a routing protocol, the destination segment identifier for invoking processing according to the dynamic return path segment routing function in the destination node.

5. The method of claim 4, wherein the routing protocol is Border Gateway Protocol or Interior Gateway Routing Protocol.

6. The method of claim 4, comprising: the destination node advertising, via the routing protocol, a second destination segment identifier of the destination node that does not identify the dynamic return path segment routing function.

7. The method of claim 6, comprising:

the source node sending into the network a third segment routing packet including the segment routing source address of the source node as its Internet Protocol source address and additionally including as the last segment identifier in a third segment list in a third segment routing header, the second destination segment identifier; and the destination node receiving the third segment routing packet, and in response, sending to the source node a third response Internet Protocol packet which does not include a segment routing header.

8. The method of claim 1, wherein each of the source node and the destination nodes are hosts.

9. The method of claim 1, wherein each of the first and second segment lists includes a particular segment identifier of a network function on a network node that performs firewall or Network Address Translation (NAT) processing on each of said particular first segment routing packet and the second segment routing packet.

10. The method of claim 1, comprising:

receiving advertisement of a non-penultimate segment popping (non-PSP) segment identifier including an attribute of not performing penultimate segment popping (PSP) on a segment routing packet; and based on said advertisement, including the non-PSP segment identifier in the first segment list in a position adjacent to the destination segment identifier.

11. The method of claim 1, comprising:

receiving advertisement of a penultimate segment popping (PSP) segment identifier of an adjacent segment routing network node in the network including an advertised attribute of performing penultimate segment popping (PSP) on a segment routing packet;

receiving advertisement of a non-penultimate segment popping (non-PSP) segment identifier of the adjacent segment routing network node in the network including an advertised attribute of not performing penultimate segment popping (PSP) on a segment routing packet; and responsive to selecting to use the non-PSP segment identifier and not the PSP segment identifier for traversing the adjacent segment routing network node based on the attribute of not performing PSP, including the non-PSP segment identifier in the first segment list in a position adjacent to the destination segment identifier.

12. The method of claim 1, wherein the last segment identifier in the first segment list is the destination segment identifier.

13. The method of claim 1, wherein the second-to-the last segment identifier in the first segment list is the destination segment identifier, and the last segment identifier in the first segment list is a segment identifier, different than the destination segment identifier, of the destination node.

14. A method, comprising:

receiving, by a receiving node, an Internet Protocol (IP) segment routing packet including an IP Destination Address of a particular segment identifier, with particular segment identifier including a function value of a dynamic return path segment routing function, and with the particular segment identifier being an IP address of the receiving node;

processing said received IP segment routing packet by the receiving node, with said processing including operating according to the dynamic return path segment routing function in response to the function value in the particular segment identifier in generating a plurality of responding headers of a responding segment routing packet; and sending the responding IP segment routing packet into the network by the receiving node;

wherein said generating a plurality of responding headers includes copying a plurality of segment identifiers from one or more received headers of said received IP segment routing packet into said responding headers, with an ordering of said copied segment identifiers in said responding headers specifying a responding segment identifier traversal order in the network which is a reverse of a network traversal order of said copied segment identifiers taken by the IP segment routing packet to reach the receiving node, with the network traversal order defined by the ordering of said copied segment identifiers in the IP segment routing packet when said received by the receiving node.

15. The method of claim 14, wherein the receiving node is a host; and wherein the method comprises:

determining, by an application in the receiving node, response application information based on source application information extracted from said received IP segment routing packet; and adding said response application information to the responding IP segment routing packet prior to said sending said generated the responding IP segment routing packet into the network.

16. The method of claim 14, comprising the receiving node advertising, via a routing protocol, the particular segment identifier for invoking processing according to the dynamic return path segment routing function by the receiving node.

17. The method of claim 14, wherein said responding headers include a responding Internet Protocol header, and a responding segment routing header including a responding segment list; and wherein said generating a plurality of responding headers includes adding the Internet Protocol source address of said received IP segment routing packet as the last segment identifier in the responding segment list; and wherein the plurality of segment identifiers includes one or more segment identifiers in a segment routing list in one of said received headers of said received IP segment routing packet.

18. A receiving node, comprising:

one or more hardware interfaces sending and receiving packets; and one or more network processors with memory associated therewith;

wherein the receiving node, communicatively coupled to a network, performs packet processing operations including segment routing-capable (SR-capable) packet processing operations, with said packet processing operations including:

reacting to a function value of a dynamic return path segment routing function in a particular segment identifier included in a segment routing packet received by the receiving node in a network and with the particular segment identifier being an address of the receiving node, the receiving node generating a responding segment routing packet which includes copying a plurality of segment identifiers from one or more received headers in said received segment routing packet into one or more responding headers of the responding segment routing packet to specify a responding segment identifier traversal order in the network which is the reverse of the traversal order defined by the plurality of segment identifiers as located in said received segment routing packet; and sending into the network, by the receiving node, said generated responding segment routing packet including said one or more responding headers;

wherein said responding headers include a responding Internet Protocol header, and a responding segment routing header including a responding segment list; and wherein said copying the plurality of segment identifiers from said received headers into said responding headers includes: copying the Internet Protocol source address of said received segment routing packet as the last segment identifier in the responding segment list, and copying a plurality of particular segment identifiers from a received segment routing list into the responding segment list resulting in reverse ordering of the plurality of segment identifiers in the responding segment list in comparison to the received segment routing list.

* * * * *

UNITED STATES PATENT AND TRADEMARK OFFICE

CERTIFICATE OF CORRECTION

PATENT NO. : 10,924,399 B2
APPLICATION NO. : 15/922860
DATED : February 16, 2021
INVENTOR(S) : Filsfils et al.

It is certified that error appears in the above-identified patent and that said Letters Patent is hereby corrected as shown below:

In the Claims

Column 14, Claim 15, Line 61, "said generated" should be deleted

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*